Patented Feb. 26, 1924.

1,484,918

UNITED STATES PATENT OFFICE.

ARTHUR V. WILKER, OF BEREA, OHIO, ASSIGNOR TO NATIONAL CARBON COMPANY, INC., A CORPORATION OF NEW YORK.

ELECTRIC BATTERY.

No Drawing.   Application filed May 9, 1919.   Serial No. 295,979.

*To all whom it may concern:*

Be it known that I, ARTHUR V. WILKER, a citizen of the United States, residing at Berea, in the county of Cuyahoga and State of Ohio, have invented a certain new and useful Improvement in Electric Batteries, of which the following is a full, clear, and exact description.

This invention relates to an improvement in electric batteries and more particularly to the type of dry cell which has a dry mix containing depolarizing material and electrolyte and which is adapted to be made ready for use by the addition of water through a suitable opening in the top of the cell.

According to the usual method of manufacturing such cells, manganese peroxide, carbon, sal ammoniac (ammonium chloride) and zinc chloride are all mixed together in a dry powdered condition. The mix is then tamped between a zinc container electrode lined with bibulous paper and a central carbon electrode, and sealed with pitch in the usual manner. The filling opening may be either in the seal or the electrode.

Although such cells are not subject to deterioration through local action on the zinc while on shelf or in storage, they have other disadvantages which reduce the service to a fraction of the service obtained from a similar ordinary cell tamped with a moist mix. The principal cause of the shorter service of these cells resides in the fact that the mix must have low density, that is, it must be made of relatively coarse materials having more voids than the ordinary dry cell mix, in order for it to readily absorb the water subsequently added.

A dense mix made by combining fine and coarse particles of manganese and carbon and a dry electrolyte in prior ways, prevents proper distribution of the water which is added subsequently to put the cell in an active condition, as it is not porous enough.

The addition of water to the coarse mix, on the other hand, dissolves out the particles of electrolyte, leaving a spongy, mushy mass which settles on being rapped or jarred, giving non-uniform current values in the different cells. When water is added the cells take up more of it than originally calculated on, on account of these conditions, which dilutes the electrolyte below the value found to be best suited for efficient service.

Another disadvantageous feature in prior types of cells is the fact that after long periods on shelf the dry zinc chloride tends to parchmentize the bibulous lining and reduce its permeability to the electrolyte.

The principal object of the present invention is to overcome these disadvantages without changing the mechanical structure or method of filling cells of the type described.

In accordance with my process I dissolve the electrolyte materials, consisting of ammonium chloride and zinc chloride, in water, the water preferably being heated in order to obtain more concentrated solutions. I then stir into the solution a mixture of manganese peroxide and carbon, consisting of coarse and fine particles, until the particles are wetted and permeated by the electrolyte solution. I use a mix of fine and coarse particles obtained by ordinary grinding, as it is unnecessary to separately prepare and mix the different sized particles, although this could of course be done if desired. After mixing in this manner the mix is dried in any suitable drying apparatus to eliminate substantially all of the water, coarse crushed, and then tamped in the cell and sealed in the usual manner. Since the manganese and carbon particles are permeated with the electrolyte, an unusual amount of the latter is added to the cell without taking up additional space.

By placing the ammonium chloride and zinc chloride in solution and subsequently drying, a combination of the zinc chloride and ammonium chloride, or a hydration of the zinc chloride, is produced by which the affinity of the zinc chloride for water is decreased so that the bibulous paper lining is not subsequently parchmentized when stored for long periods, as is set forth in the application of D. C. Reed, Serial No. 295,982, filed May 9, 1919.

When water is added to the cell made in accordance with my process, it is found that the mix comprising coarse and fine particles permeated by electrolyte salts will absorb and distribute the water almost as readily as a mix of coarse particles alone of carbon, manganese peroxide and electrolyte. As already stated, if fine and coarse particles of manganese peroxide and carbon commingled with dry electrolyte are used in the ordinary way, the water is not distributed throughout the mix readily. Consequently the use of coarse particles alone has previously been considered necessary. On account of the density of the mix due to the commingling of various sized particles, and the fact that there are no detached electrolyte particles to dissolve out, the mix does not become mushy upon adding water. The cell is therefore not subject to variations in current capacity when rapped or jarred. The amount of water absorbed is also considerably less, due to reduced voids, and a properly concentrated electrolyte results.

My experiments with the cells made by the improved process have shown an increased life of from three to five times that of cells made by prior processes.

Having described my invention, what I claim is:

1. A substantially dry pulverulent depolarizing mix for batteries, having particles impregnated with electrolyte salt.

2. A substantially dry pulverulent mix for batteries having particles containing carbon and manganese material, impregnated with electrolyte salt.

3. A substantially dry pulverulent mix for batteries, having particles impregnated with ammonium chloride and zinc chloride.

4. Method of preparing a mix for use in dry batteries which comprises mixing solid depolarizing material with electrolyte solution, substantially drying the mixture, and comminuting the dry material.

5. Method of preparing a mix for use in dry batteries which comprises mixing together solid depolarizing material, carbon, and electrolyte solution, substantially drying the mixture, and comminuting the dry material.

6. In the method of preparing a mix for use in dry batteries, the steps of preparing a substantially dry massive material containing a solid depolarizing material impregnated with electrolyte salt, and then comminuting said massive material.

In testimony whereof, I hereunto affix my signature.

ARTHUR V. WILKER.